June 18, 1968   R. E. RICHARDSON   3,388,983
PRESS BENDING MOULD HAVING MODIFIED RECESSES
FOR THE GLASS SHEET ENGAGING MEANS
Filed June 21, 1965   3 Sheets-Sheet 1

Inventor
Ronald E. Richardson
By Cushman, Darby & Cushman
Attorneys

June 18, 1968 R. E. RICHARDSON 3,388,983
PRESS BENDING MOULD HAVING MODIFIED RECESSES
FOR THE GLASS SHEET ENGAGING MEANS
Filed June 21, 1965 3 Sheets-Sheet 2

Inventor
Ronald E. Richardson
By Cushman, Darby & Cushman
Attorneys

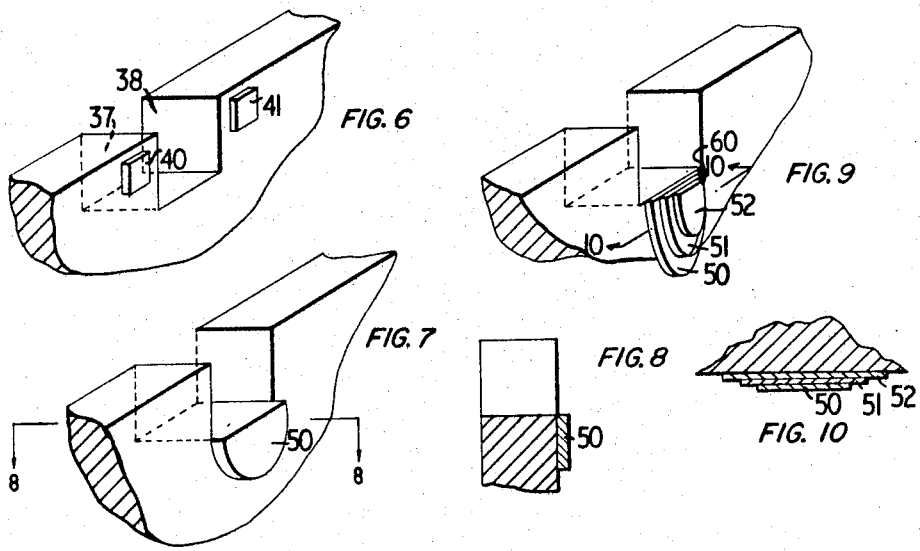

United States Patent Office 3,388,983
Patented June 18, 1968

3,388,983
PRESS BENDING MOULD HAVING MODIFIED RECESSES FOR THE GLASS SHEET ENGAGING MEANS
Ronald E. Richardson, Oshawa, Ontario, Canada, assignor to Pittsburgh Plate Glass Company, Pittsburgh, Pa.
Filed June 21, 1965, Ser. No. 465,421
Claims priority, application Canada, Mar. 22, 1965, 926,193
8 Claims. (Cl. 65—286)

ABSTRACT OF THE DISCLOSURE

An apparatus for press bending glass sheets which have been heat softened, the apparatus including a pair of forming members having complementary concave and convex shaping surfaces and recesses for receiving glass engaging members during pressing, the concave shaping surface being provided adjacent the recesses with raised surfaces extending from the recesses in a direction transverse to the axis of curvature of the shaping surface to contact the sheet of glass during bending so as to reduce distortion.

This invention relates to improvements in press bending glass sheets to shape the same and particularly, to modifications to the shaping surfaces of forming members to correct distortion in a bent glass sheet shaped by sandwiching the glass sheet between two complementary shaping surfaces while the sheet of glass is in a plastic state.

Flat glass sheets are shaped successively by heat-softening and sandwiching the major surfaces thereof between a pair of glass forming members having complementary convex and concave shaping surfaces opposing one another. During such an operation, the glass sheets are either gripped near their upper edges by tongs or engaged by hair pin balancing members depending upon the type of installation. In the event tongs are used, they are suspended from carriages which are conveyed along a horizontal path of a conveyor that extends through a furnace and a glass forming station. Each glass sheet is suspended in a vertical plane from the tongs and normally more than one set of tongs is needed in which event they are disposed in horizontal spaced relation along the upper edge of the suspended sheet.

Many devices have been developed to insure that flat glass sheets are properly suspended initially from a plurality of sets of tongs. Proper loading reduces the likelihood that each set of tongs will apply a twisting force that distorts the glass and imposes a defect known as a kink therein. When glass is loaded properly, the gripping force applied thereto by each set of tongs is substantially equal to that applied by each other set of tongs.

In a further type of installation, the glass sheet is supported on its lower edge and balanced in a vertical position by hair pin like balancing members engaging the glass sheet adjacent its upper edge.

In either of the two foregoing types of installation, recesses are required in the forming members to receive an end portion of the glass engaging members, i.e., the gripping portion of the tongs or the glass engaging end portion of the hair pin like balancing members.

To effect bending, a pair of forming members are moved inwardly to sandwich the sheet of glass therebetween while the latter is suspended from an overhead rail by a plurality of tongs or otherwise supported in a vertical position. In the preferred form, it would be desirable to contact the entire surface of the glass sheet with the shaping surfaces of the forming members but this is not possible due to the space requirement of the glass engaging portion of the supporting members. The forming members accordingly are recessed to receive the supporting members, such as the tong end portions but as a result of this recess, a certain portion of the bent glass sheet is distorted. One might expect that only the glass sheet area corresponding to the recess would be distorted but in actual practice, this is found not to be the case.

In actual fact, the distortion is found to extend downwardly generally in a V shape pattern from the recess in a direction normal to the axis of curvature.

The present application is concerned with correction of distortion caused by the glass sheet entering the recess which occurs when the sheet is either supported by tongs or has its upper surface balanced by balancing hair pins. Distortion caused by the recesses is found to be at a maximum while bending a sheet of glass in a curvature about a horizontal axis. It has been found that little or no distortion occurs as a result of the recesses while bending about a vertical axis. The distortion of concern in the instant case is a result of the lack of a shaping surface due to the recess whereby the softened glass tends to enter the recess of the mold having the marginal edges thereof first to contact the flat glass sheet just prior to bending.

It is an object of the present invention to minimize the amount of distortion caused by the referred-to recesses by modifying the shaping surface adjacent the recesses.

The invention is illustrated by way of example in the drawings wherein:

FIG. 6 is an oblique, partial sectional view illustrating further means of modifying the shaping surface adjacent the recess, which means are less efficient than the preferred embodiments to correct distortion in the bent sheet of glass;

FIG. 7 is a similar view illustrating a further means of modifying the shaping surface; and FIG. 8 is a cross-sectional view along section 8—8 of FIG. 7;

FIG. 9 is a view similar to FIGS. 4, 6 and 7 but illustrating a still further means of modifying the shaping surface; and FIG. 10 is a sectional view along section 10—10 of FIG. 9.

Figure 1:
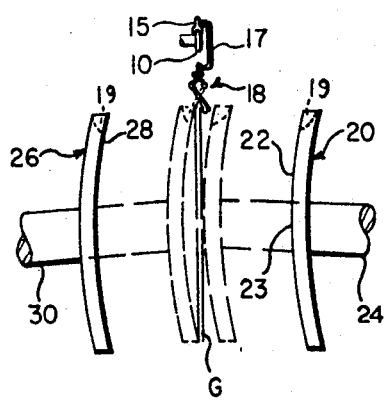
FIG. 1 is a vertical, end elevational view illustrating a portion of a press bending apparatus including a pair of complementary forming members movable from an open to a closed position to sandwich a vertically suspended glass sheet therebetween.
Figure 2:
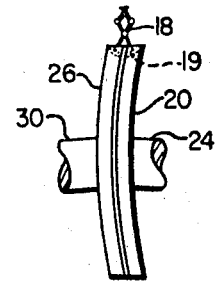
FIG. 2 is a similar view with the forming members and glass sheet in a sandwiched position.

Referring now in detail to the drawings, shown in FIG. 1 is a pair of complementary forming members consisting of rigid members 20 and 26 secured respectively to the shafts 24 and 30 of a press bending apparatus. The shafts are movable relative to one another along their respective longitudinal axis whereby the molds are movable from the position shown in solid lines in FIG. 1, which is the open position, to a closed position as illustrated in FIG. 2. The molds 20 and 26 include respective convex and concave complementary shaping surfaces 22 and 28 engageable with opposed surfaces of a glass sheet G.

The sheet of glass G is disposed generally vertical and is supported from an overhead conveyor by a plurality of tongs 18 secured to a rail 15 by hangers 17. The conveyor consists of a plurality of rollers 10 secured to stub shafts which may be driven or freely rotatable all of which is well known in the art.

In order to effect bending of the sheet of glass G, the rigid forming members 20 and 26 are movable from their open position, shown in FIG. 1, to their closed position, shown in FIG. 2, by hydraulic cylinders or other means to pressingly engage opposed surfaces of a heat softened sheet. During pressing the glass sheet conforms to the complementary shaping surfaces.

Initial contact of the shaping surfaces with the glass sheet is illustrated in phantom in FIG. 1 wherein the upper and lower marginal edges of one face of the sheet of glass G engages the corresponding marginal edges of the concave shaping surface while the opposite surface of the sheet of glass engages the convex shaping surface at a position intermediate the upper and lower marginal edges.

Figure 3:
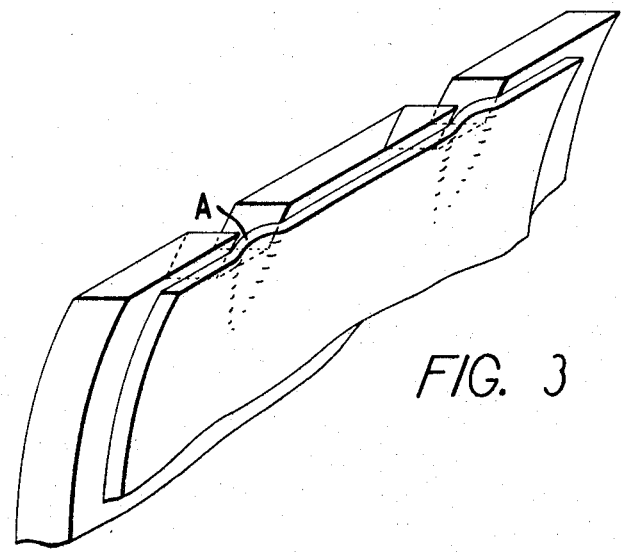
FIG. 3 is an oblique partial sectional diagrammatic view illustrating distortion in a bent glass sheet caused by recesses in the concave shaping surface adjacent the marginal edge.

Each of the shaping surfaces 22 and 28 includes recesses as indicated at 19, adjacent the upper marginal edge, to receive the glass engaging end portion of the tongs. It will be realized that only one tong is illustrated in FIGS. 1 and 2; however, in actual practice there are, as previously mentioned, at least two tongs engaging the sheet being bent. In this case, there would be a pair of recesses in the shaping surface of each of the forming members with such pair of recesses disposed at spaced positions along the upper horizontal edge of the forming members. During further pressing of the members, the sheet of glass conforms to the shaping surfaces of the forming members; however, as illustrated in FIG. 3, during such further pressing a portion A of the glass sheet projects into each of the recesses of the concave shaping surface and thereby causes distortion in the bent sheet of glass.

The portion A which is distorted, is generally V shaped in a direction transverse to the longitudinal axis of curvature of the bent sheet. It has been found that this distortion extends downwardly below the recess. In accordance with the present invention, it has been found that the distortion can be reduced by modifying the shaping surface of the concave mold by providing a raised embossment adjacent the recess.

Figure 4:
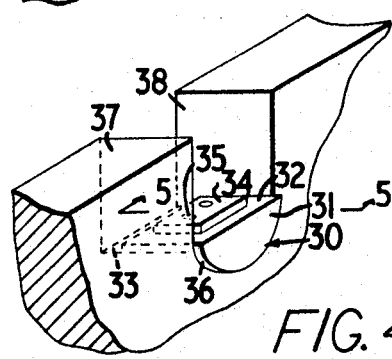
FIG. 4 is an oblique partial sectional view illustrating one means in accordance with the present invention of modifying the shaping surface adjacent the recess to correct distortion of the type illustrated in FIG. 3, in the bent sheet of glass.
Figure 5:
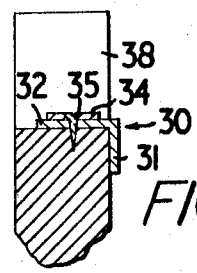
FIG. 5 is a cross-sectional view along section 5—5 of FIG. 4.

In FIG. 4, is shown one means of modifying the shaping surface adjacent the recess by providing a metal shim 30 substantially L shaped having leg portions 31 and 32 disposed substantially normal to one another. The legs 32 is secured to a wall 33 of the recess by a plate 34 using a pair of screws 35. The leg 31 extends downwardly from the recess toward the axis of curvature and in the preferred form, includes an arcuately shaped outer edge 36. The angle between legs 31 and 32 may be somewhat less than 90°, say 87°, to maintain the leg 31 in engagement with the shaping surface. In the preferred form, the lowermost point of the arcuate edge of the leg 31 is located at a position where maximum distortion occurs, which in most instances is intermediate the side walls 37 and 38 of the tong receiving recess.

In actual experimentation, it has been found that an arcuately shaped shim having a leg 31 approximately 2" in diameter and .006" in thickness extending downwardly along the shaping surface in a recess approximately 2" x 2" in the shaping surface provides a bent glass sheet with a minimum of distortion caused by such recess.

FIG. 6 illustrates a pair of projections 40 and 41 disposed respectively adjacent the side walls 37 and 38 of the recess and disposed relative to notch 19 along lines substantially parallel to the axis of curvature. During bending glass about a horizontal axis of curvature, it was found that the projections so located had little if any effect in correcting distortion and accordingly the positioning of the shim is found to be rather important.

FIGS. 7 to 10 illustrate further means of modifying the shaping surfaces by providing an embossment on the shaping surface adjacent the recess. In FIGS. 7 and 8 the embossment 49 is formed integrally with the mold. This, however, is expensive and from a commercial point of view generally not feasible.

In FIG. 9 there is illustrated a still further means of modifying the shaping surface which consists of spraying a coating 60 onto the shaping surface adjacent the recess. The coating may be applied either as a single layer or a plurality of layers. A plurality of layers may be applied by masking and spraying the coating, successively utilizing masks where the aperture progressively is smaller to provide layers 50, 51 and 52 which progressively are smaller in V-shape. This provides a coating having a generally sloped or contoured marginal edge.

The integrally formed projection or embossement as illustrated in FIG. 7 is applicable to forming members made of wood, metal or the like as is also the shim member disclosed in the FIG. 4 embodiment. Spraying, however, is generally limited to metallic molds but again this need not necessarily be so, the requisite being of course, applying a material which will adhere to the mold surface through repeated use of the mold and be heat resistant so as to be substantially unaffected by the heated glass sheet during press bending.

In the various embodiments illustrated in the drawings it will be noted that the terminal edge of the embossment is shown substantially normal to the shaping surface. The purpose is for clarity of illustration however in actual practice such terminal edge could be rounded or gently sloped. Also in the drawings the thickness of the embossment is exaggerated in size for clarity of illustration. In FIG. 10, for example, each of the layers 50, 51 and 52 would be approximately .002".

From the foregoing, it will be seen that in general, the present invention consists of modifying the shaping surface of a concave mold adjacent the tong receiving recess and more specifically, consists of providing an embossment or protrusion in the shaping surface adjacent the recesses first contacted by the glass sheet during press bending and at a location between the recess and the axis of curvature. In most all cases, only the concave mold need be modified since as illustrated in FIG. 1, this is the first surface contacted adjacent the recess by the sheet of glass during press bend. Any recesses, or the like which occur in the convex mold do not bear against the sheet of glass except in the final sandwiched position as illustrated in FIG. 2; however, in this event, the glass would have no tendency to enter such recess.

I claim:

1. In the art of press bending glass sheets wherein a sheet of heat softened glass engaged by members at spaced marginal locations is sandwiched between a pair of forming members having complementary concave and convex shaping surfaces and recesses therein to receive said glass engaging members during pressing, the improvement comprising providing the concave shaping surface adjacent the recesses with raised surfaces at a location extending from each of the respective recesses in a direction transverse to the axis of curvature of the shaping surface to contact the sheet of glass during bending and thereby reduce distortion in the bent sheet of glass.

2. The improvement defined in claim 1 wherein the raised surface adjacent each recess is generally V shaped extending in a direction from the recess transverse to the axis of curvature.

3. The improvement as defined in claim 2 wherein the apex of the V shape is disposed at a position substantially intermediate planes occupied by vertical side walls defining such recess.

4. A forming member for press bending a glass sheet comprising a rigid member having a concave shaping surface, a recess in said shaping surface adjacent a marginal edge disposed generally parallel to the axis of curvature of said shaping surface and a raised portion on said shaping surface, said raised surface being disposed adjacent the recess and extending in a direction transverse to said axis of curvature to reduce distortion in a bent sheet of glass caused by the recess during bending of the glass sheet on said forming member.

5. A forming member as defined in claim 4 wherein said raised surface portion is an integral part of the mold member.

6. A forming member as defined in claim 4 wherein the raised portion is a shim secured to the mold adjacent said recess.

7. A forming member as defined in claim 4 wherein said rigid member is metal and the raised portion adjacent the recess consists of a coating applied to the shaping surface.

8. A forming member as defined in claim 4 wherein said raised portion consists of a plurality of successively applied coatings of graduated decreasing V shape contour extending from a common edge of the recess in a direction transverse to the axis of curvature.

References Cited

UNITED STATES PATENTS

| | | | |
|---|---|---|---|
| 2,270,470 | 1/1942 | Paddock | 65—273 X |
| 3,279,906 | 10/1966 | Baker | 65—275 X |
| 3,290,136 | 12/1966 | Thomas | 65—275 |

DONALL H. SYLVESTER, *Primary Examiner.*

A. D. KELLOGG, *Assistant Examiner.*